United States Patent [19]
Schmidt

[11] Patent Number: 5,973,321
[45] Date of Patent: Oct. 26, 1999

[54] METHOD FOR DETERMINING MULTIPLE THERMAL NEUTRON DECAY COMPONENTS FROM THE CAPTURE GAMMA RAY SPECTRUM MEASURED BY A PULSED NEUTRON INSTRUMENT

[75] Inventor: Mathew G. Schmidt, Houston, Tex.

[73] Assignee: Western Atlas International, Inc., Houston, Tex.

[21] Appl. No.: 08/873,229

[22] Filed: Jun. 11, 1997

[51] Int. Cl.[6] .................................................. G01V 5/10
[52] U.S. Cl. ................................ 250/269.6; 250/269.8
[58] Field of Search ............................. 250/269.8, 269.6

[56] References Cited

FOREIGN PATENT DOCUMENTS

89/11108  11/1989  WIPO .................................. 250/269.8

OTHER PUBLICATIONS

R. C. Hertzog, "Laboratory and Field Evaluation of an Inelastic–Neutron–Scattering and Capture Gamma Ray Spectroscopy Tool." Presented at the 53rd Annual Fall Technical Conference and Exhibition of the Society of Petroleum Engineers of AIME, Houston, Texas, Oct. 1978.

Sales Brochure, PDK 100, Western Atlas Logging Services, Houston, Texas 1994.

Menke, Geophysical Data Analysis: Discrete Inverse Theory, pp. 109–130(1984).

*Primary Examiner*—Constantine Hannaher
*Attorney, Agent, or Firm*—Richard A. Fagin

[57]  ABSTRACT

A method for determining the fractional amounts of, and the thermal neutron capture cross-sections of, individual components which are included in the decay spectrum measured by a pulsed neutron well logging instrument. The instrument includes a pulsed high energy neutron source, and one or more gamma ray detectors spaced apart from the source. The method includes generating a data kernel which is made up of representors of decay components of the wellbore and of the earth formations in the vicinity of the instrument. The decay spectrum measured by the instrument is inverted to determine parameters by which the representors are scaled so that in combination the scaled representors most closely match the measured decay spectrum. The parameters represent the fractional amounts of each exponential decay component which makes up the measured exponential decay spectrum.

8 Claims, 5 Drawing Sheets

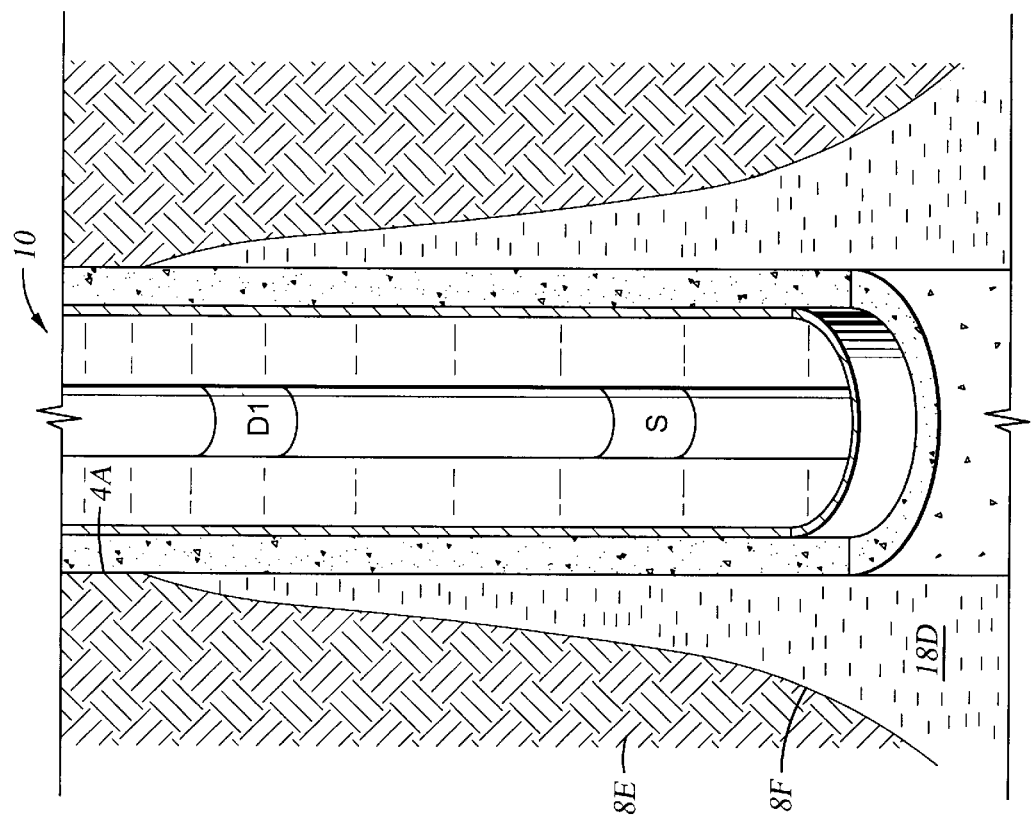
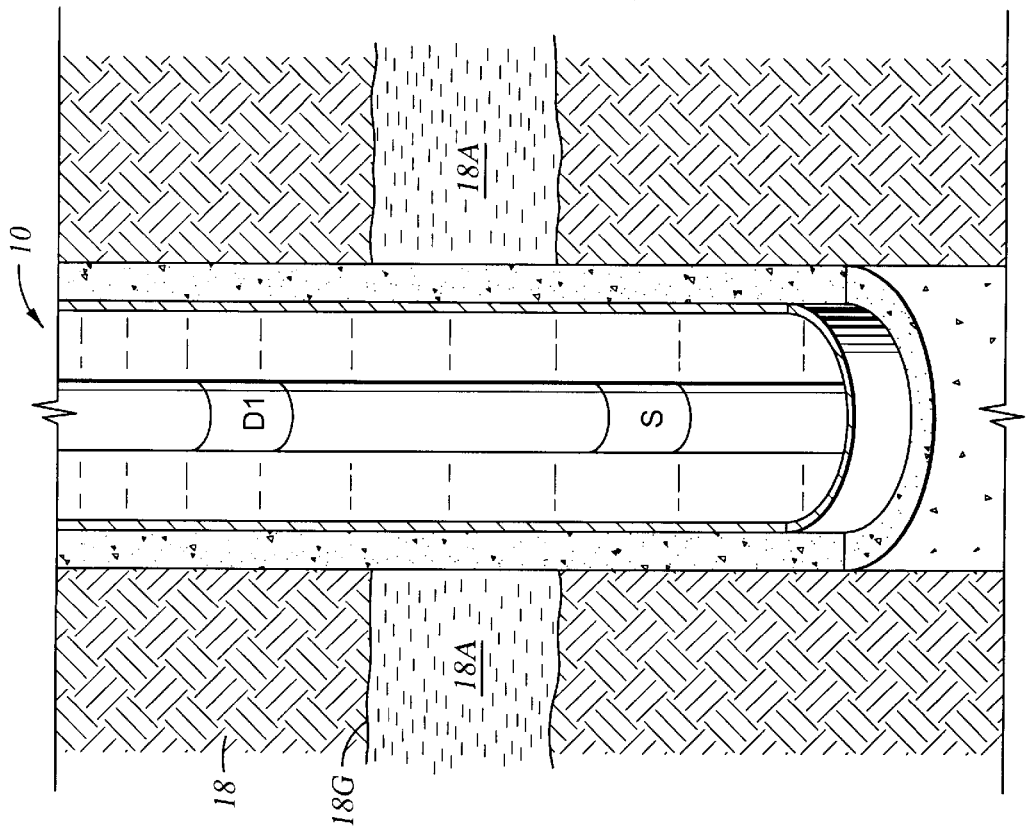

METHOD FOR DETERMINING MULTIPLE THERMAL NEUTRON DECAY COMPONENTS FROM THE CAPTURE GAMMA RAY SPECTRUM MEASURED BY A PULSED NEUTRON INSTRUMENT

BACKGROUND OF THE INVENTION

1. Field of the Invention

The invention is related to the field of pulsed neutron well logging instruments. More specifically, the invention is related to methods of processing measurements from a pulsed neutron well logging instrument for determining various properties of earth formations penetrated by a wellbore. The measurements made by the instrument are used to determine the macroscopic thermal neutron capture cross-section of the earth formations by calculating the thermal neutron decay time (also known as "neutron lifetime"). The processing method enables separating and determining fractional contributions of, and macroscopic thermal neutron capture cross-sections of, various regions of the earth formation and the wellbore nearby the well logging instrument.

2. Description of the Related Art

Pulsed neutron well logging instruments are known in the art for determining the macroscopic thermal neutron capture cross-section of earth formations penetrated by a wellbore. A typical pulsed neutron well logging instrument is described, for example, in a sales brochure entitled PDK-100, Western Atlas Logging Services, Houston, Tex. (1994). Typical pulsed neutron instruments include a controllable source of high-energy neutrons, and one or more gamma ray radiation detectors positioned at spaced apart locations from the neutron source. The source is periodically activated to emit controlled-duration "bursts" of high-energy neutrons into the earth formations surrounding the well borehole. The neutrons interact with atomic nuclei of the materials in the earth formations, losing energy with each interaction until the neutrons reach the thermal energy level (defined as having a most likely energy of about 0.025 electron volts). Depending on the material composition of the earth formations proximal to the instrument, the thermal neutrons can be absorbed, or "captured", at various rates by certain types of atomic nuclei in the earth formations. When one of these atomic nuclei captures a thermal neutron it emits a gamma ray, referred to as a "capture gamma ray".

The rate at which the capture gamma rays are emitted, with respect to the elapsed time after the end of the neutron "burst" depends on, among other things, the relative concentration per unit volume in the earth formations of atomic nuclei which have a relatively large tendency to absorb thermal neutrons and emit capture gamma rays in response. This tendency is referred to as the thermal neutron capture "cross-section". A common chemical element found in earth formations having high capture cross-section atomic nuclei is chlorine. Chlorine in earth formations is usually present in the form of chloride ion in solution in connate water present in the pore spaces of some of the earth formations. Chlorine has a very high thermal neutron capture cross-section. Thus a measurement of the thermal neutron decay time (or neutron lifetime) of the earth formations in the vicinity of the wellbore can be indicative of amount of saline fluid present in the pore spaces of the earth formation. When combined with values of connate water salinity, fractional volume of pores space ("porosity"), and measurements of the fractional content of fine grained particles in the formation ("formation shaliness") it is possible to determine the fractional fluid saturation of useful materials, such as oil or gas, present in the pore spaces of the earth formation.

It has proven difficult to determine the fractional saturation of oil or gas under certain wellbore conditions by processing the capture gamma ray measurements according to methods known in the art for determining the thermal neutron capture cross-section, $\Sigma_F$, of the earth formation of interest. Several factors contribute to the difficulty of determining $\Sigma_F$ using the methods known in the art. First, the well logging instrument is typically inserted into a wellbore which is filled with liquid. At the time the pulsed neutron instrument is typically used, the wellbore generally has inserted therein a steel liner or casing. The liner or casing is generally held in place by cement filling an annular space between the wellbore wall and the exterior of the liner or casing. As high energy neutrons leave the neutron source in the logging instrument, the liquid in the wellbore has the effect of rapidly moderating (or slowing down) the high energy neutrons to the thermal level because of the high concentration of hydrogen nuclei in the liquid.

In general, the relative numbers ("population") at any particular time after a neutron burst, of thermal neutrons in the wellbore and in the earth formations proximal to the wellbore will depend on the porosity and on the hydrogen nucleus concentration per unit volume within the earth formation. The thermal neutrons present in the wellbore and in the earth formations can be "captured" or absorbed by nuclei of various chemical elements in the wellbore and formations, at a rate which depends upon the relative concentration and on the thermal neutron capture cross-section of these elements. In wellbores and in earth formations some of the more common elements having high thermal neutron cross-sections include chlorine, hydrogen, iron, silicon, calcium, boron, and sulfur. The thermal neutron decay time or "neutron lifetime", as determined from measurements of capture gamma rays made by the well logging instrument, represents combined effects of the thermal neutron capture cross-section in each of several "regions" (volumes of space surrounding the logging instrument) within the wellbore as well as from the earth formations proximal to the wellbore. These regions generally include the instrument itself, the fluid in the wellbore, the steel casing, the cement, the earth formation radially proximal to the wellbore wall (which may have been infiltrated by fluid from within the wellbore), and the earth formations radially more distal from the wellbore wall (which have minimal infiltration from the fluid in the wellbore).

Determining $\Sigma_F$ using data processing methods known in the art can be further complicated if the earth formation does not have a truly homogenous material composition on the scale of measurements made by the well logging instrument. Conditions in the earth formations subject to this difficulty can include a earth formations consisting of a layered "sand/shale" sequence wherein the layers are on the order of 3–4 inches thick, or can include the presence of a fluid transition zone such as a gas/oil or an oil/water contact in the earth formation. Other conditions can include the presence of a radial zone located within approximately 2–8 inches from the wellbore wall having a different fluid than in a radially more distal zone, this being familiar to those skilled in the art as being caused by such processes as "invasion" (the previously described fluid infiltration), and gas or water "coning" as well as other processes known in the art.

The capture gamma ray detection rate as measured by the logging instrument will necessarily include fractional contributions from all of the regions in the vicinity of the logging instrument. Each of these regions has an indeterminate fractional contribution to the overall capture gamma ray counting rate as measured by the logging instrument, and can also have an unknown value of capture cross-section.

Several processing methods are known in the art for determining the macroscopic thermal neutron capture cross-section of the formation, $\Sigma_F$, from the measured capture gamma ray counting rates with respect to time after the end of each neutron burst (referred to as the counting rate "spectrum"). Prior art processing methods included the assumption that the thermal neutron capture cross-section of the regions within the wellbore are significantly higher than the capture cross-section of the surrounding earth formations. Limitations to these methods are described, for example, in U.S. Pat. No. 4,409,481 issued to Smith et al.

The processing method described in the Smith et al '481 patent includes the assumption that the decay of the gamma ray counting rate with respect to time includes the effects of two and only two distinct exponential decay rates, the first caused by the materials within the wellbore and the second caused by the materials in the earth formations proximal to the wellbore. The method described in the Smith et al '481 patent includes the assumption that the length scales of the materials in the wellbore and in the earth formation are such that the effects of neutron diffusion averages out the actual variations in capture cross-section between the various regions and therefore can be represented by some average value of thermal neutron capture cross-section. As discussed previously, several common conditions exist where this is clearly not the case. Using the processing method described in the Smith et al '481 patent can lead to erroneous results under these conditions.

SUMMARY OF THE INVENTION

The invention is a method for determining the fractional amounts of, and the thermal neutron capture cross-sections of, various regions in a wellbore and regions in earth formations in the vicinity of the wellbore each having a distinct mean neutron decay time or macroscopic thermal neutron capture cross-section. The method includes generating a data kernel which is made up of representors, or models, of potential decay components of the wellbore and of the earth formations in the vicinity of the wellbore. A thermal neutron decay spectrum is measured by a pulsed neutron instrument including a controllable source of high energy neutrons and one or more gamma ray detectors at spaced apart locations from the source. The decay spectrum measured by the instrument is inverted to determine model parameters by which the individual representors are scaled so that when combined, the scaled representors most closely match the measured decay spectrum. The parameters represent the fractional amounts of each exponential decay component which makes up the measured composite exponential decay spectrum. The inversion process is constrained such that all model parameters are non-negative.

BRIEF DESCRIPTION OF THE DRAWINGS

FIG. 3 shows a simulated wellbore and earth formation used to test the invention comprising 20 percent porosity limestone saturated with oil, penetrated by a wellbore having salt water therein, and an invaded zone in the formation saturated with salt water.

FIG. 6 shows an example of a layered earth formation, which can be resolved using the method of the invention.

FIG. 7 shows an example of water coning, which can be resolved using the method of the invention.

DESCRIPTION OF THE PREFERRED EMBODIMENT

A pulsed neutron well logging instrument which can provide thermal neutron capture gamma ray measurements suitable for use with the method of this invention is described in a sales brochure entitled, PDK-100, Western Atlas Logging Services, Houston, Tex. (1994). It is to be understood that the invention is not limited to processing measurements made by the instrument described in this reference, but can also be used with measurements made by other sensor arrangements such as a pulsed neutron measurement-while-drilling (MWD) instrument, or a pulsed neutron sensor permanently emplaced either within a wellbore or permanently emplaced within, above, or below a subterranean reservoir in earth formations but not located within a wellbore.

Figure 1:
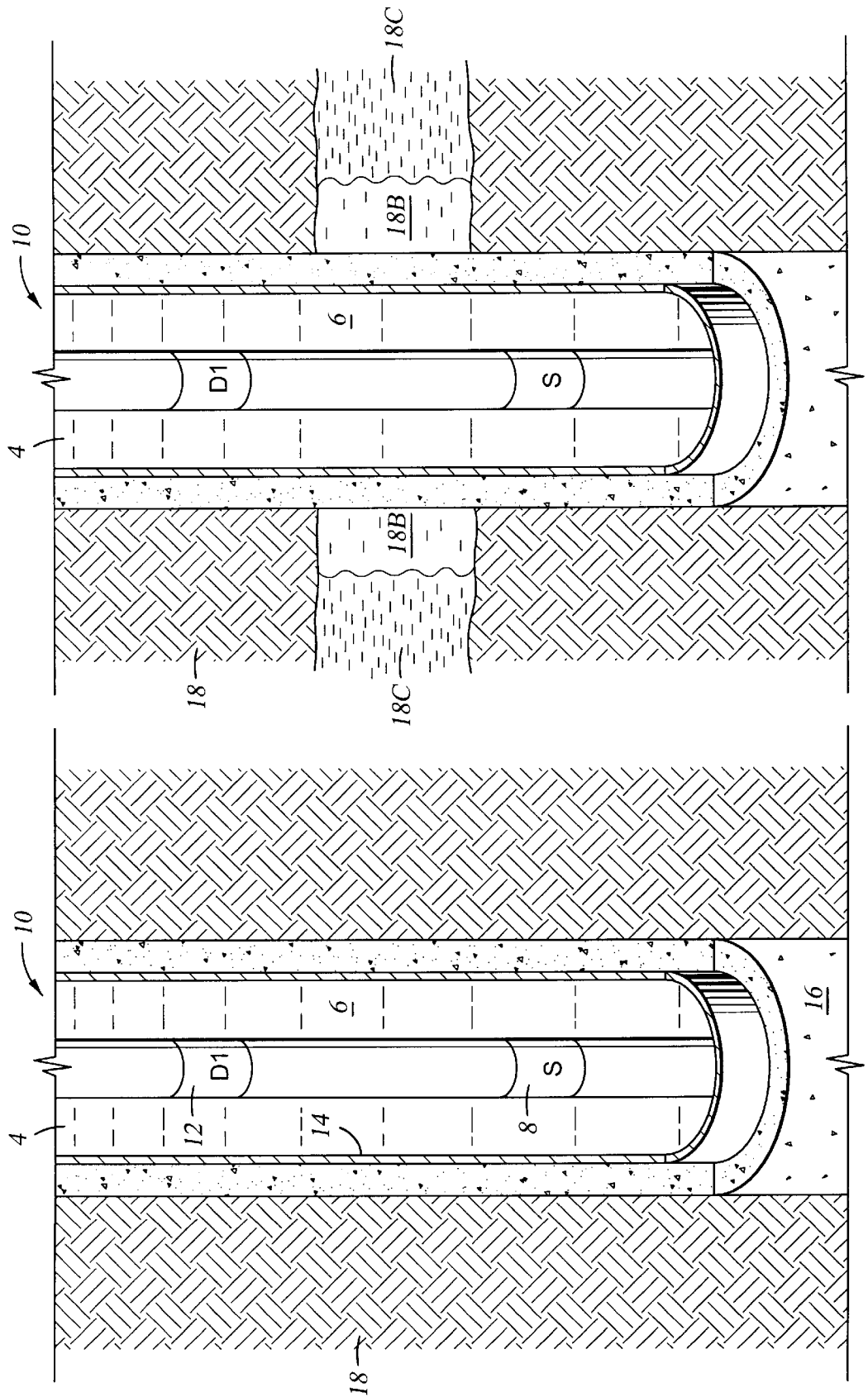
FIG. 1 shows various regions within the wellbore and in the vicinity of the wellbore, including a pulsed neutron logging instrument positioned in the wellbore.

The well logging instrument described in the PDK-100 reference includes a controllable source of high-energy neutrons, and gamma ray detectors positioned at spaced apart locations from the neutron source. Referring to FIG. 1, the well logging instrument 10 is typically inserted into a wellbore 4 penetrating earth formations 18. The wellbore 4 is generally filled with a liquid 6 of some type familiar to those skilled in the art. The instrument's 10 source 8 is periodically energized to produce short, controlled duration "bursts" of high-energy neutrons which interact with the earth formations 18 surrounding the instrument 10. Through interaction with the liquid 6 in the wellbore 4 and with the earth formations 18, the neutrons are reduced in energy to the thermal level, where they are susceptible to capture by atomic nuclei which have a high thermal neutron capture cross-section. Such a nucleus emits a "capture" gamma ray when it captures a thermal neutron, and the gamma ray may be detected by one of the detectors, one being shown at 12, on the well logging instrument 10. The manner of using the pulsed neutron logging instrument to obtain unprocessed capture gamma ray counting information about the earth formations is well known in the art.

The pulsed neutron well logging instrument 10 also typically includes circuits for counting the numbers of gamma rays detected by each one of the detectors 12. These circuits generally include the capability for determining some measurement of the time at which each gamma ray is detected with respect to the beginning (or end) of the neutron burst. The pulsed neutron well logging instrument can also include circuits for transmitting signals to the earth's surface which correspond, for each detector 12, to the numbers of gamma rays detected and the relative time of detection of the gamma rays. The well logging instrument 10 can alternatively, or in combination with the transmitting circuits, include other circuits used for storing signals corresponding to the gamma rays detected, for subsequent processing within the well logging instrument 10 itself. It should clearly be understood that the process of this invention may be performed within circuits located within the logging instrument itself, and that transmission of the gamma ray detection signals to the earth's surface for processing at the earth's surface is not meant to be a limitation on this invention.

A particularly useful feature of the well logging instrument described in the PDK-100 reference as it concerns this invention is that the gamma rays detected by the instrument are segregated into about 100 discrete, short-interval time windows, called "gates". Each gate corresponds to a different time interval after the end of the neutron burst. As will be further explained, determining the gamma ray counting rates in a relatively large number of short-duration gates after each neutron "burst" can substantially improve the ability to determine characteristics of the earth formations which are related to the capture gamma ray counting rates. It should be clearly understood that the number of gates into which the detected gamma rays are segregated is not a limitation on the invention. More or fewer gates may be used than as described in the PDK-100 reference, however using more, shorter duration gates may provide the advantage of being able to better resolve a plurality of individual, exponentially-decaying components in the materials surrounding the instrument. These components each can partially contribute to the overall gamma ray counting rate measured during the time span from the end of the neutron burst to the beginning of the subsequent neutron burst. For purposes of this invention it is unnecessary for the gates to be absolutely contiguous in time and to have equal time duration. However, the statistical accuracy of the results calculated using the method of this invention can be improved if the amount of "dead time" between bursts for which no counts are measured is kept to a minimum.

Figure 2:
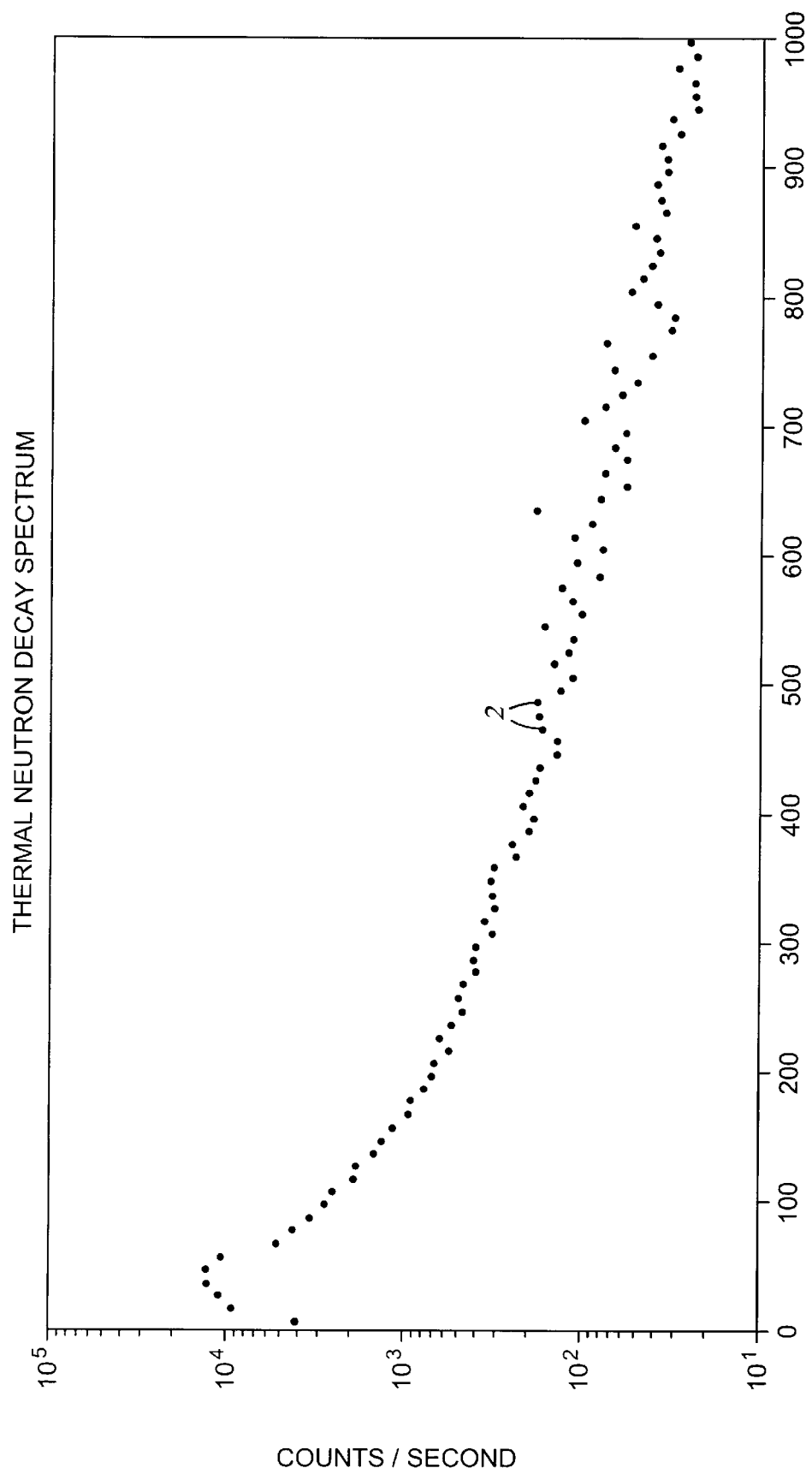
FIG. 2 shows detector counting rates with respect to time for a pulsed neutron well logging instrument.

FIG. 2 shows a graph of typical gamma ray counting rates, with respect to time after the neutron burst, for gamma rays detected at one of the two detectors using a pulsed neutron well logging instrument similar to the one described in the PDK-100 reference. The coordinate axis of the graph in FIG. 2 represents time after initiation of the neutron burst, and the ordinate axis corresponds to the numbers of gamma rays detected in each gate (which directly corresponds to the "counting rate" for each gate since the gates are all substantially equal in duration). The time value for a gamma ray counting rate associated with each gate is preferably assigned to the midpoint of the time span for each gate (the "center time" for each gate). The number of gamma rays detected in each gate is shown as a discrete point, such as shown at 2. The timing of the instrument described in the PDK-100 reference, as previously explained, includes 100 such gates between the end of the neutron burst and the initiation of the subsequent neutron burst, each gate having a duration of about 10 microseconds.

As is known in the art, a substantial number of the gamma rays detected during, or very soon after, the end of each neutron burst typically results from so-called "inelastic" neutron collision events, where a high-energy neutron strikes an atomic nucleus in the formation, and the nucleus has an atomic mass such that only a small portion of the neutron's energy is lost as a result of the collision. The energy lost by the neutron in an inelastic collision results in a gamma ray (referred to as an "inelastic gamma ray") being emitted. For purposes of the invention, the inelastic gamma rays are generally unimportant. The gamma ray counting rates actually used in the process of the invention, therefore, can be those occurring only after a suitable time delay, typically less than about 5 microseconds after the end of the neutron burst. After the time delay the high energy neutrons have generally been moderated and the inelastic events will no longer will substantially affect the gamma ray measurements.

A sequence, or "set", of gamma ray measurements for purposes of this invention can be defined as all those gamma ray counts detected in each gate between the end of the neutron burst plus the suitable time delay as previously described, and the initiation of the subsequent neutron burst. The counts measured during the measurement set can be defined in terms of the count rate (counts per unit time) at any particular time with respect to the end of the neutron burst. The count rate with respect to time can be defined as the "thermal neutron decay spectrum", represented by d, and can be expressed in vector form as:

$$d = [d_1, d_2, d_3, \ldots, d_n]^T \qquad (1)$$

where each element $d_i$ (i=1 to n) in vector d represents the measured gamma ray count rate in each gate, referenced in time to the center time $t_i$ of each gate. As is known in the art, to properly convert the number of gamma rays detected in each one of the n gates to a count rate for each gate, $d_i$, certain effects such as system "dead time" (during which a gamma ray may enter one of the detectors but not result in a detection count), and gate width (gate time span) should be properly accounted for. The magnitude of these effects depends on the design of the circuits in the instrument and on the types of detector used in the logging instrument. Methods for correcting for dead time and gate width are well known in the art. These effects are assumed to be accounted for prior to using the method of this invention as will described further herein.

The detector counting rate generally decreases exponentially ("decays") with respect to the amount of time elapsed after the end of the neutron burst. See for example, U.S. Pat. No. 4,409,481 issued to Smith et al. Referring again to FIG. 1, the measured thermal neutron decay spectrum d generally can include the combined effects of capture gamma rays emitted by one or more different "regions" in the vicinity of the logging instrument 10. The regions can include the wellbore liquid 6, a steel casing 14 in the wellbore, and cement 16 in an annular space between the casing 14 and the formation 18. The effect of gamma rays emitted from each individual region about the logging instrument will be referred to hereinafter as a "component" of the measured decay spectrum d. Each of these components can have a unique thermal neutron capture cross-section (and a corresponding unique exponential decay rate—the exponential decay rate for capture gamma rays emitted from any particular region is inversely related to the thermal neutron capture cross-section of that region). The measured gamma ray counting rate spectrum d, therefore, exhibits an overall decay characteristic which is related to the relative contribution of each one of the different regions to the overall detection decay rate.

The gamma ray counting rate at any time t after the end of the neutron burst, represented by d(t), can be approximated as the sum of the distinct regions' contributions to the overall gamma ray counting rate, as shown by the following expression:

$$d(t) = \sum_{j=1}^{m} a_j \exp(t/\tau_j) + B \qquad (2)$$

where $\tau_j$ represents the exponential decay rate of the j-th exponentially decaying component, $a_j$ represents a magnitude, related to the relative contribution of the j-th exponentially decaying component to the overall gamma ray counting rate, and B represents "background" gamma ray counts caused by neutron activation of the materials (including the liquid and earth formations) surrounding the instrument, or by other long half-life radioactive sources known in the art. Preferably the background is measured separately during an acquisition mode of the logging instrument specifically designed for that measurement, however, for the purposes of this invention the background counting rate could also form part of a "data kernel" which will be further explained. The method of the invention can determine both the number of individual components m and the relative contribution of each one of the individual components ($a_j$, for j=1 to m) to the overall gamma ray counting rate spectrum d.

In the method of the invention, the count rate spectrum d for each set of gamma ray measurements can be represented by the following equation:

$$d = \int G(\tau,t) a(\tau) d\tau \quad (3)$$

where $G(\tau, t)$ represents the previously described "data kernel" and $a(\tau)$ represents a model vector. In discrete form equation (3) can be written as:

$$d_i = \sum_{j=1}^{m} G_{ij} a_j \quad (4)$$

The data kernel contains "representors", or model decay spectra, that may form some fraction of the measured decay spectrum d. Each representor is a possible decay component which may be contained to some degree in the measured decay spectrum, d. Each representor has a known, single value of exponential decay rate $\tau$, or as previously described can be a constant representing the background counting rate B. The vector a contains model "parameters" which are to be determined. In the invention the model parameters represent the magnitude, or fractional contribution, of each of the representors to the measured decay spectrum d. The data kernel G will contain m sets of modeled thermal neutron decay components, for each of which a value may be calculated at discrete times with respect to the end of the neutron burst, such that when combined in proportions determined by the to-be-determined "parameters", would be representative of the measured decay spectrum, d. For each of the m components in the data kernel, the discrete times for which values are calculated are preferably the same as the center time of each one of the n gates in a measurement set.

The values of $\tau$ which can be used to calculate the data kernel are preferably selected from within a range of known values of $\tau$ for typical regions within the wellbore and in the earth formations. The number of values of $\tau$ actually used to generate the kernel is a matter of discretion for the user of this invention, but is preferably not greater than the number of gates, n in the measured data. That is, the number of components m should be less than the number of gates n in the measured data set. If desired the user may instead use values of the thermal neutron capture cross-section $\Sigma$ for calculating the data kernel. To simplify calculation of the data kernel, the values of $\Sigma$ should preferably be converted to values of $\tau$ by the conversion factor: $4545/\Sigma = \tau$. The values calculated for each gate center time, for each of the m individual exponentially decaying components in the data kernel, can be normalized to any arbitrarily selected value in order to simplify calculation of the data kernel.

In the invention, the decay rate spectrum d as measured by the instrument can be approximated by a linear combination of the individual exponentially decaying components in the data kernel. A constraint on the linear combination consistent with the physics of gamma ray detection is that none of the fractional contributions of any of the components can be negative, even though many of the components will have substantially zero contribution. That is, all values of $a_j$ must be greater than or equal to zero. In the invention, the fractional contribution ($a_j$ for j=1 to m) can be calculated so that the result of the method of the invention is a set of the parameters, or relative magnitudes, for each one of the individual exponential decay components in the data kernel. When the model parameters are calculated, then the resultant "earth model", represented by the vector a containing these parameters, when multiplied by the data kernel G will substantially represent the measured decay spectrum d. The method of the invention, therefore, does not provide any arbitrary fixed limit on the number of individual exponentially decaying components present in the analysis of the measured counting rate spectrum d, since the number of individual components in the analysis is limited only by the number of components m in the data kernel. In vector notation, equation (4) can be written as:

$$\hat{d} = G\hat{a} \quad 5$$

where d is a vector having n×1 elements, G is a matrix having n×m elements, and a is a vector having m×1 elements. In the invention the objective of the process is to determine the macroscopic thermal neutron cross-section of each region in the vicinity of the wellbore and the relative magnitude of contribution from each region to the measured spectrum, d.

First, the data kernel G must be determined. If no prior information concerning a suitable range of values for the data kernel is available, the data kernel can be generated using values for $\Sigma$ from within a range known in the art for values of $\Sigma$ for earth formations and wellbore fluids. A range known in the art for $\Sigma$ can be about 5 to 200 capture units (cu). As will be further explained in an alternative embodiment of this invention, using prior known values of $\Sigma$ to initialize the model vector a can further enhance the speed of the process and enhance the accuracy of the results from this invention, but using this prior information is not necessary to practice the preferred embodiment of the invention. It is also assumed in this embodiment that n>m, that is, the system of linear equation s represented by the vectors in equation (5) is over determined. The process described will also work when m is equal to or greater than n. Although it is not necessary in order to generate the data kernel, it may be assumed that the values of $\Sigma$ used to generate the data kernel are evenly spaced between the endpoints of the range of values used for $\Sigma$. The data kernel, G can be computed as follows:

$\sum = [5, 10, 15, 20, 25, \ldots 200]$     % range of sigma $\tau = 4545./ \sum;$     % convert to decay time constant for $i = 1:m$ for $j = 1:n$ $G_{ji} = \exp(-t_j/\tau_i)$     % Compute the representor end end Next the parameters (representing the magnitude, or fractional contributions of each one of the representors in the data kernel present in measured decay spectrum d) are determined. Determining the parameters is a "linear inverse problem" where the objective is to minimize an $L_2$ norm using the following constraints:

$$\|\hat{d} - \hat{G}\hat{a}\|_2; \hat{a} \geq 0 \quad\quad 6$$

One method d for solving equation (6) is described for example in Menke, *Geophysical Data Analysis: Discrete Inverse Theory*, pp. 109–130 (1984). Other methods for determining a solution to equation (6) are known in the art, and can include methods in the frequency domain or in Laplace space.

The invention was tested using a simulated set of regions about a wellbore. Referring to FIG. 3, a synthetic decay spectrum was generated for the condition where the instrument 10 is operated in an 8.5 inch (21.59 cm) diameter wellbore 4 penetrating a limestone (calcium carbonate) earth formation 18. The wellbore 4 is filled with water 6 having 250,000 parts per million (ppm) concentration of sodium chloride (salt). The limestone formation 18 has a fractional volume of pore spaces (porosity) of twenty percent. The pore spaces are filled with two different fluids segregated radially with respect to the wellbore 4. The first fluid, shown at 18B, occupies the pore spaces of the limestone formation 18 radially proximal to the wellbore 4 extending to a distance of about five inches from the wellbore wall. The fluid 18B in the formation proximal to the wellbore is 250,000 ppm salt water. In the radially more distal zone, the pore spaces are filled with oil, shown generally at 18C.

Figure 4:
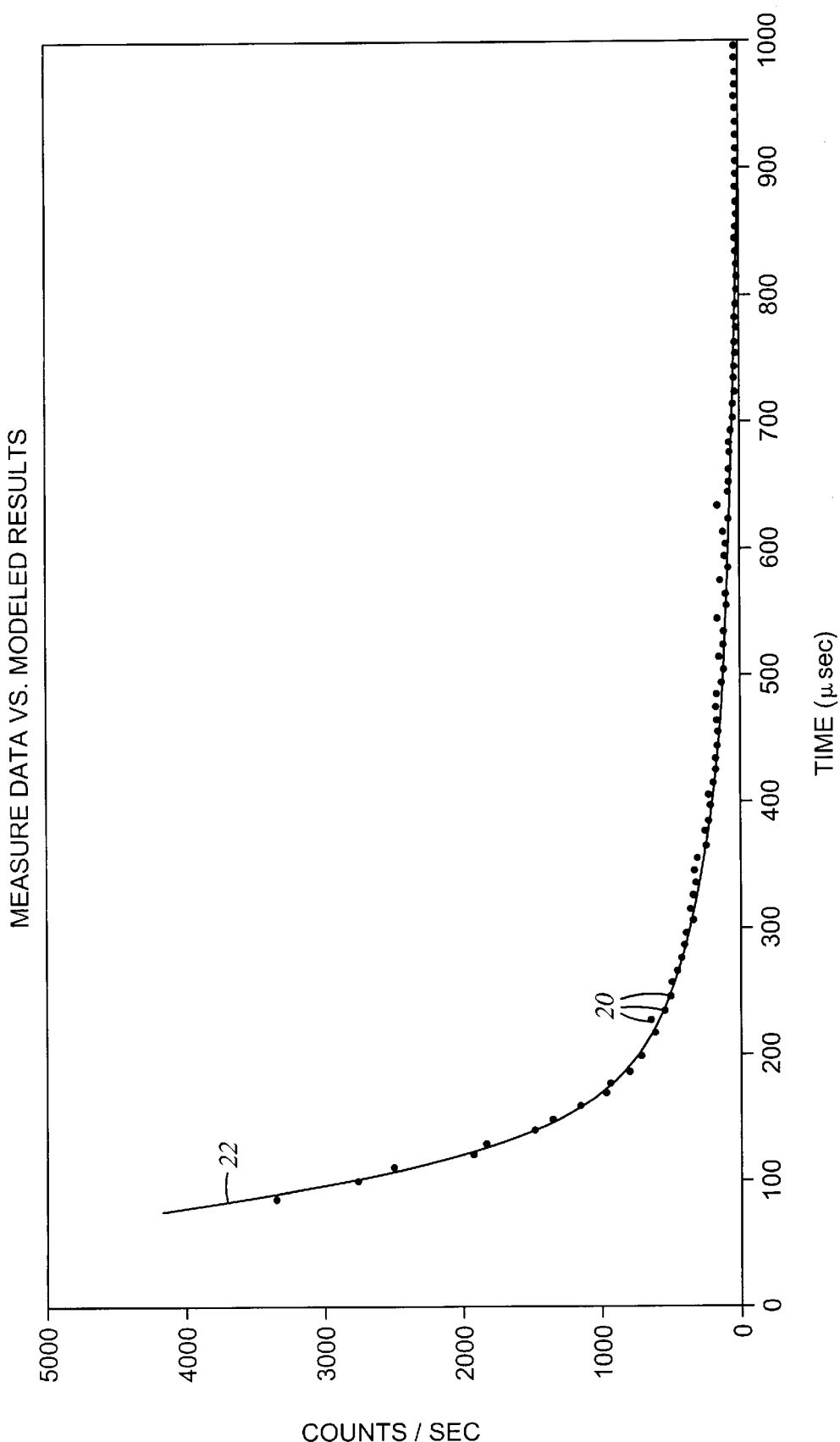
FIG. 4 shows a synthetic capture gamma ray counting rate spectrum for the wellbore and formation in FIG. 3 as was used to test the method of the invention.
Figure 5:
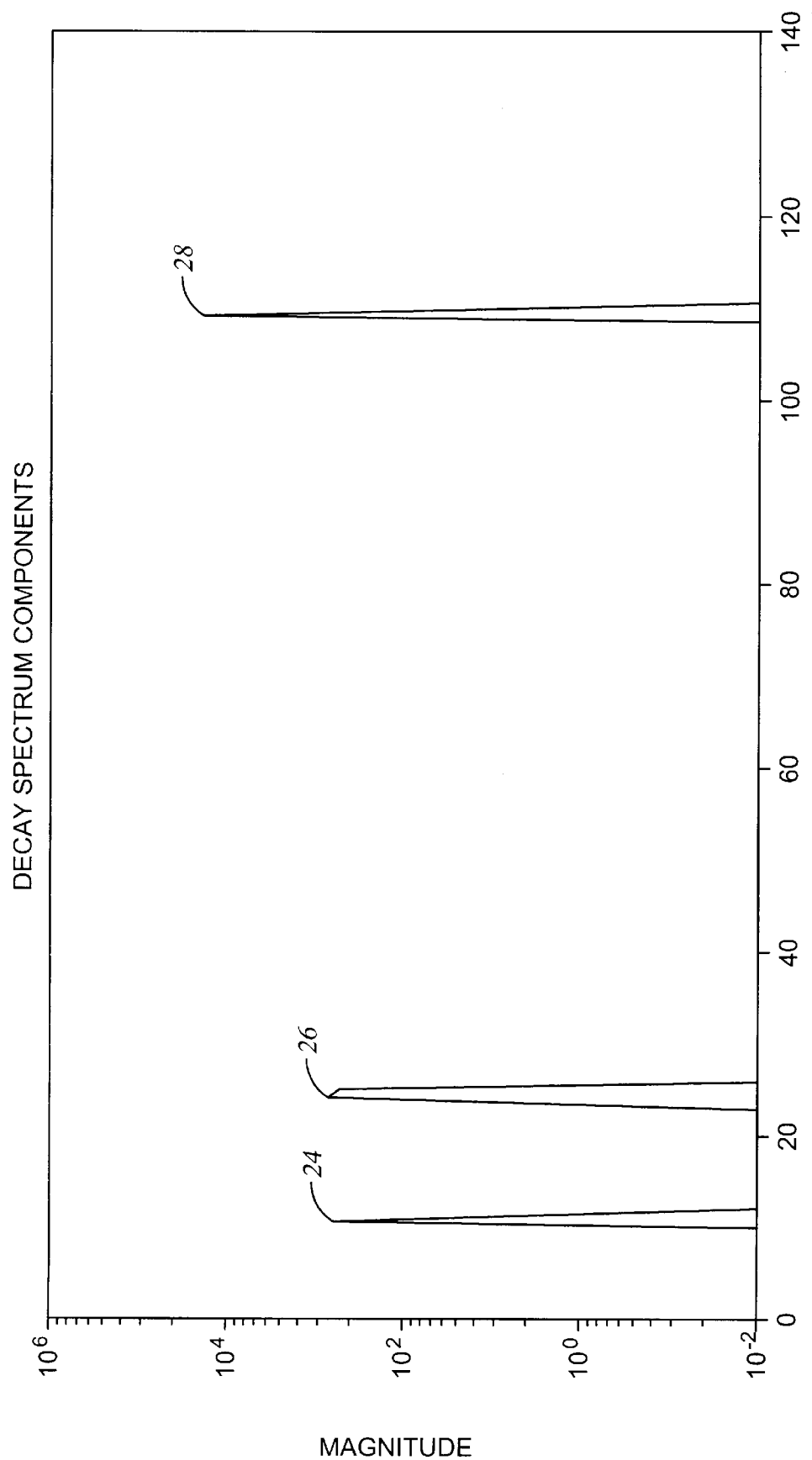
FIG. 5 shows a graph of a solution with respect to thermal neutron decay time provided by the method of the invention from the detector counting rate curve of FIG. 4.

An example of the results obtained using the method of the invention for the simulated conditions of FIG. 3 can be observed in FIGS. 4-5. FIG. 4 shows a graph of detector counting rates (a decay spectrum) generated using Monte Carlo simulation. The counting rates were modeled for the detector nearest the source for an instrument similar to the one shown in the PDK-100 reference.

A data kernel was generated using equally spaced apart values of capture cross-section $\Sigma$, ranging from about 2 capture units (c.u.) to about 140 c.u. with a spacing of about 2 c.u., to calculate the representors. After solving a linear combination according to equation (6), calculated results can be observed in FIG. 4. The simulated "measured" capture gamma ray spectrum (the decay spectrum generated by Monte Carlo simulation) is plotted as discrete data points, shown generally at 20. The decay spectrum model resulting from solution to equation (6) is overlain on the "measured" data points as a solid curve 22.

The results shown in FIG. 5 represent the magnitudes of each decay component used to generate the modeled results. The magnitude of most of the components is zero, however, three distinct "peaks" are observable. A first peak 24 is observable at $\Sigma$ of about 11 c.u., which corresponds to the capture cross-section of the oil-saturated limestone formation. A second peak 26 observable at $\Sigma$ of about 24 c.u. corresponding to the salt-water saturated limestone formation. A third peak 28 observable at $\Sigma$ about 109 c.u. corresponds to the salt water-filled wellbore. For clarity of the foregoing example, responses which would obtain from other regions about the wellbore, the steel casing, and the cement in the annular space were not used to generate the Monte Carlo simulation of the decay spectrum, and consequently these regions exhibit no response in the calculated results.

Other conditions in the earth formations which can be resolved using the method of this invention can be observed in FIGS. 6 and 7. In FIG. 6, an earth formation 18 consists of a layered "sand/shale" sequence 18A wherein the layers are on the order of 3–4 inches thick, or alternatively can include the presence of a fluid transition zone such as a gas/oil or an oil/water contact 18G in the earth formation. The method of the invention can also resolve the presence, shown in FIG. 7 of a radial zone 18D located within approximately 2–8 inches, as shown generally at fluid contact 18F, away from the wellbore wall 4A, this zone having a different fluid than in a radially more distal zone 18E. This condition is familiar to those skilled in the art as being caused by such processes as "invasion" (the previously described fluid infiltration), and gas or water "coning" as well as other processes known in the art.

DESCRIPTION OF ALTERNATIVE EMBODIMENTS

Other embodiments of this invention are possible which can improve both the speed and accuracy with which the results are calculated. These improvements include improving the information content of the measured capture gamma ray data, using prior knowledge to constrain the earth model, and using the previously described embodiment of this invention in an iterative technique.

The first of these alternative embodiments of the invention is related to improving the information content of the measured capture gamma ray data prior to processing according to the method of the previously described embodiment of this invention. It is well known in the art that the information content, or frequency content, in an exponentially decaying phenomenon or signal is inversely proportional to the time from initiation of the phenomenon or signal. In the case of thermal neutron decay measurements, the statistical accuracy of the capture gamma ray measurements decreases with elapsed time from the end of the neutron burst. An improved method for acquiring the thermal neutron decay spectrum would use narrow time gates early in time after the end of the neutron burst, and progressively wider time gates later in time after the end of the neutron burst. As an example, for the well logging instrument described in the PDK-100 reference, approximately the first ten gates after the end of the neutron burst could have widths of about 2 to 5 microseconds. Approximately the next ten to twenty gates could have widths of about 10 microseconds. Later gates could have progressively wider gates. This gating technique would limit the overall number of gates used, while maximizing the information content and statistical accuracy of the gamma ray counts allocated to each time gate. Other improvements to the signal acquisition of the pulsed neutron instrument could be made to improve the information content of the data, such as having variable width gates to maximize information content, and/or a narrower source burst to reduce the averaging effect on the measured data.

A second improvement to the process of this invention involves reducing the amount of computation time required to solve the linear system as in equation (6). The computation time required to invert the data is proportional to the number of representors used in the data and to the length of the data vector. Data from pulsed neutron instruments have limited statistical accuracy, this accuracy being based on the number of gamma rays detected in each time gate. The linear system in equation (6) may not always have a unique solution as a result of the limited statistical accuracy of the gamma ray measurements. By appropriately limiting the number of, and the value of, the representors used in the data kernel, the computation efficiency of the invention can be improved, and the likelihood of converging to a unique, correct solution is increased. Several different methods can be used to constrain the model. Knowledge of the borehole fluid capture cross-section is one such means. If the mean thermal neutron capture cross-sections of the decay component in the wellbore is sufficiently large compared to that of the earth formation components, then prior art methods, such as described in U.S. Pat. No. 4,409,481 issued to Smith et al can be used to determine the wellbore decay component directly. The representors used in the data kernel can then be limited to values of Σ representing likely values of earth formation decay components, and the one value for the wellbore decay component previously determined. Where the pulsed neutron instrument is used for the purpose of monitoring fluid movements in the earth formations, for example, the mineral content ("lithology") and the porosity of the earth formations may be well known from other types of measurements. These values can be incorporated into the data kernel and model parameters to help constrain the model and reduce the time to convergence on a solution. Similarly, by using the calculated results according to equation (6) from capture gamma ray measurements made in axial "zones" along the wellbore near to or overlapping with the currently measured zone, or from prior analysis of the same zone, can be used to modify or update the data kernel. Previously calculated values from equation (6) can also be used to provide initial values for the parameters in the model vector (A in equation (6)). By using "prior knowledge" to provide possible values for the representors in the data kernel, or to provide initial estimated values for the model parameters, the time to calculate a solution for any particular set of capture gamma ray measurements can be reduced substantially.

Those skilled in the art will devise other embodiments of this invention which do not depart from the spirit of the invention as disclosed herein. Accordingly, the invention should be limited in scope only by the attached claims.

What is claimed is:

1. A method for determining fractional amounts and thermal neutron capture cross-sections of individual components in a counting rate spectrum of capture gamma rays detected by a pulsed neutron instrument, the method comprising:

generating a data kernel including representors each consisting of an individual exponential decay rate with respect to time; and generating a linear combination of said representors of said data kernel so that a difference between said linear combination and said counting rate spectrum reaches a minimum, whereby said fractional amounts and said thermal neutron capture cross-sections of said components are determined from parameters of said linear combination which result in said difference reaching said minimum, said parameters of said linear combination initialized by selecting values of said capture cross-section and said fractional amounts calculated from a counting rate spectrum measured by said logging instrument corresponding to different materials surrounding said logging instrument.

2. The method as defined in claim 1 further comprising:

segregating said counting rate spectrum into a plurality of substantially equal duration gates wherein a time value is assigned to correspond to gamma rays detected within each of said gates; and wherein values are calculated for each of said representors of said kernel at times corresponding to each of said time values for said gates.

3. The method as defined in claim 1 further comprising:

segregating said counting rate spectrum into a plurality of gates wherein a time value is assigned to correspond to gamma rays detected within each of said gates, said gates each having a time duration inversely proportional to a length of time after termination of a neutron burst generated by said pulsed neutron instrument at which each of said gates occurs; and wherein values are calculated for each of said representors of said kernel at times corresponding to each of said time values for said gates.

4. The method as defined in claim 1, further comprising:

separately determining a fractional amount and a capture cross-section corresponding to one of said components originating in a wellbore; and generating said data kernel using a representor corresponding to said capture cross-section of said wellbore component and using representors corresponding only to likely values of capture cross-sections for earth formations, thereby reducing a total number of said representors in said data kernel.

5. A method for determining fractional amounts and thermal neutron capture cross-sections of individual components in a counting rate spectrum of capture gamma rays detected by a pulsed neutron instrument, the method comprising:

generating a data kernel including representors each consisting of an individual exponential decay rate with respect to time, said data kernel generated by separately determining a fractional amount and a capture cross-section corresponding to one of said components originating in a wellbore and using a representor corresponding to said capture cross-section of said wellbore component and using representors corresponding only to likely values of capture cross-sections for earth formations, thereby reducing a total number of said representors in said data kernel;

generating a linear combination of said representors of said data kernel so that a difference between said linear combination and said counting rate spectrum reaches a minimum, whereby said fractional amounts and said thermal neutron capture cross-sections of said components are determined from parameters of said linear combination which result in said difference reaching said minimum.

6. The method as defined in claim 5 further comprising:

segregating said counting rate spectrum into a plurality of substantially equal duration gates wherein a time value is assigned to correspond to gamma rays detected within each of said gates; and wherein values are calculated for each of said representors of said kernel at times corresponding to each of said time values for said gates.

7. The method as defined in claim 5 further comprising:

segregating said counting rate spectrum into a plurality of gates wherein a time value is assigned to correspond to gamma rays detected within each of said gates, said gates each having a time duration inversely proportional to a length of time after termination of a neutron burst generated by said pulsed neutron instrument at which each of said gates occurs; and wherein values are calculated for each of said representors of said kernel at times corresponding to each of said time values for said gates.

8. The method as defined in claim 5, further comprising:

selecting values of said capture cross-section and said fractional amounts calculated for a counting rate spectrum measured by said logging instrument corresponding to different materials surrounding said instrument; and initializing parameters of said linear combination by said selected values so that a time to generate said linear combination having said minimum difference is reduced.

* * * * *